(12) United States Patent
Behroozpour et al.

(10) Patent No.: US 11,947,044 B2
(45) Date of Patent: Apr. 2, 2024

(54) STRESS-OPTIC PHASE SHIFTER ARRAY FOR LIDAR AND OTHER APPLICATIONS

(71) Applicant: Robert Bosch GmbH, Stuttgart (DE)

(72) Inventors: Behnam Behroozpour, S. San Francisco, CA (US); Seow Yuen Yee, Mountain View, CA (US); Ken Wojciechowski, Cupertino, CA (US); Ning Wang, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 916 days.

(21) Appl. No.: 16/964,163

(22) PCT Filed: Jan. 18, 2019

(86) PCT No.: PCT/EP2019/051223
§ 371 (c)(1),
(2) Date: Jul. 22, 2020

(87) PCT Pub. No.: WO2019/149545
PCT Pub. Date: Aug. 8, 2019

(65) Prior Publication Data
US 2021/0003675 A1 Jan. 7, 2021

Related U.S. Application Data

(60) Provisional application No. 62/624,148, filed on Jan. 31, 2018.

(51) Int. Cl.
*G01S 7/48* (2006.01)
*G01S 7/481* (2006.01)
(Continued)

(52) U.S. Cl.
CPC .......... *G01S 7/4818* (2013.01); *G01S 7/4814* (2013.01); *G02F 1/0134* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 5,233,673 | A | 8/1993 | Vali et al. |
| 5,313,535 | A | 5/1994 | Williams |

(Continued)

FOREIGN PATENT DOCUMENTS

| | | |
|---|---|---|
| CN | 1342272 A | 3/2002 |
| CN | 107111169 A | 8/2017 |
| WO | 2018/011868 A1 | 1/2018 |

OTHER PUBLICATIONS

International Search Report corresponding to International Patent Application No. PCT/EP2019/051223, dated Mar. 28, 2019 (4 pages).

(Continued)

*Primary Examiner* — Hovhannes Baghdasaryan
(74) *Attorney, Agent, or Firm* — Maginot, Moore & Beck LLP

(57) ABSTRACT

An optical element for transmitting a light beam includes a waveguide configured to transmit the light beam from an input end to an output end and having an optical property that can be modified by deformation of the waveguide. A phase-shifter is affixed to the waveguide and is operable in response to a control signal to mechanically deform the waveguide sufficient to induce a phase shift in the light beam transmitted therethrough. The phase-shifter can include a PZT layer.

14 Claims, 9 Drawing Sheets

(51) Int. Cl.
   *G02F 1/01*      (2006.01)
   *G01S 17/931*    (2020.01)

(56) References Cited

U.S. PATENT DOCUMENTS

| | | |
|---|---|---|
| 6,453,086 B1 | 9/2002 | Tarazona |
| 6,614,947 B1 | 9/2003 | Al-hemyari |
| 2015/0110441 A1 | 4/2015 | Heideman et al. |

OTHER PUBLICATIONS

Hosseini, N. et al., "Stress-optic modulator in TriPlex platform using a piezoelectric lead zirconate titanate (PZT) thin film," Optics Express, vol. 14018, May 19, 2015 (9 pages).

Wikipedia.org, "Photoelasticity," Revision as of Sep. 27, 2017 (6 pages).

Wikipedia.org, "Photoelastic modulator," Revision as of Jun. 10, 2017 (2 pages).

Epping, J. P. et al., "Ultra-low-power stress-optics modulator for microwave photonics," Proceedings of the Society of Photo-Optical Instrumentation Engineers (SPIE), vol. 10106, Integrated Optics: Devices, Materials, and Technologies XXI, Feb. 16, 2017 (8 pages).

Jin, W. et al., "Piezoelectric tuning of a suspended silicon nitride ring resonator," 2017 IEEE Photonics Conference (IPC), Oct. 1, 2017 (2 pages).

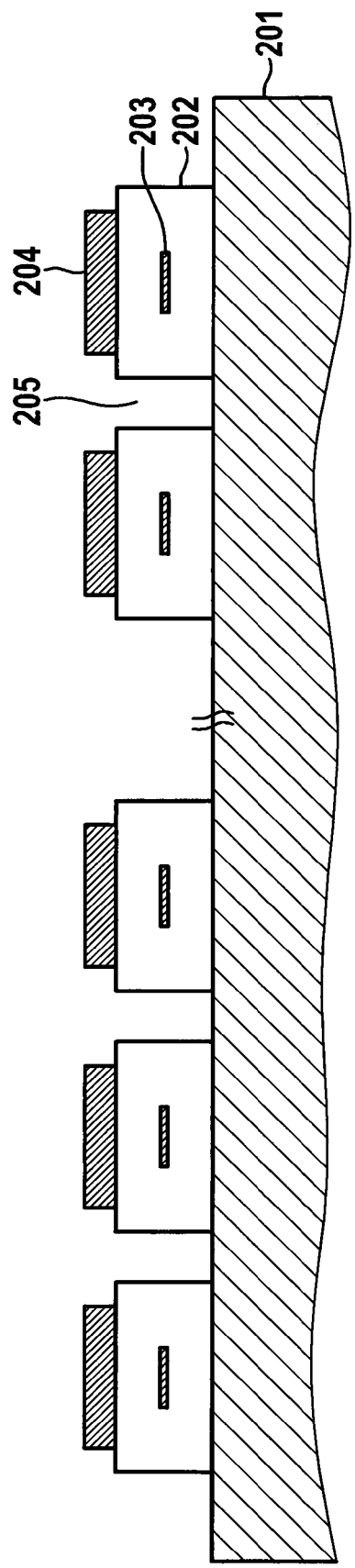
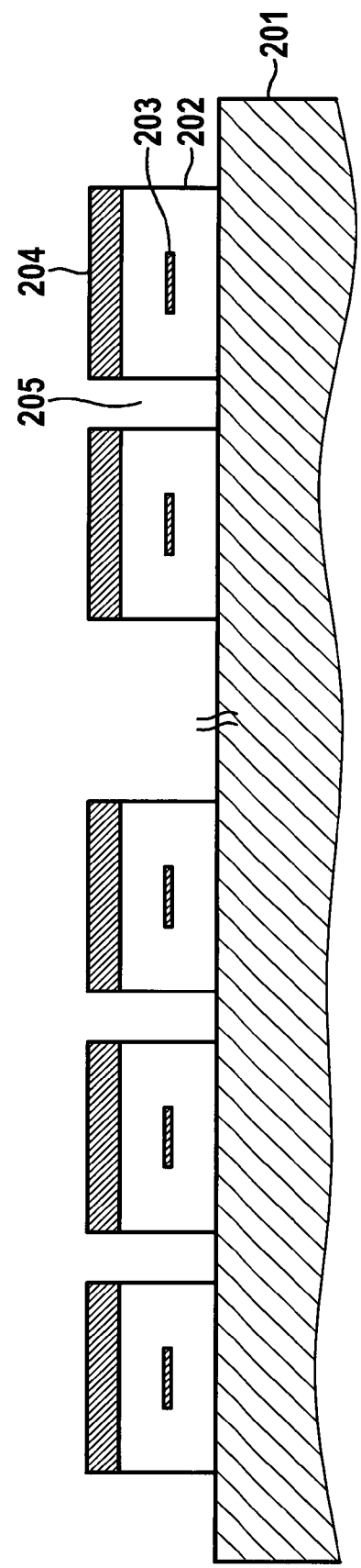

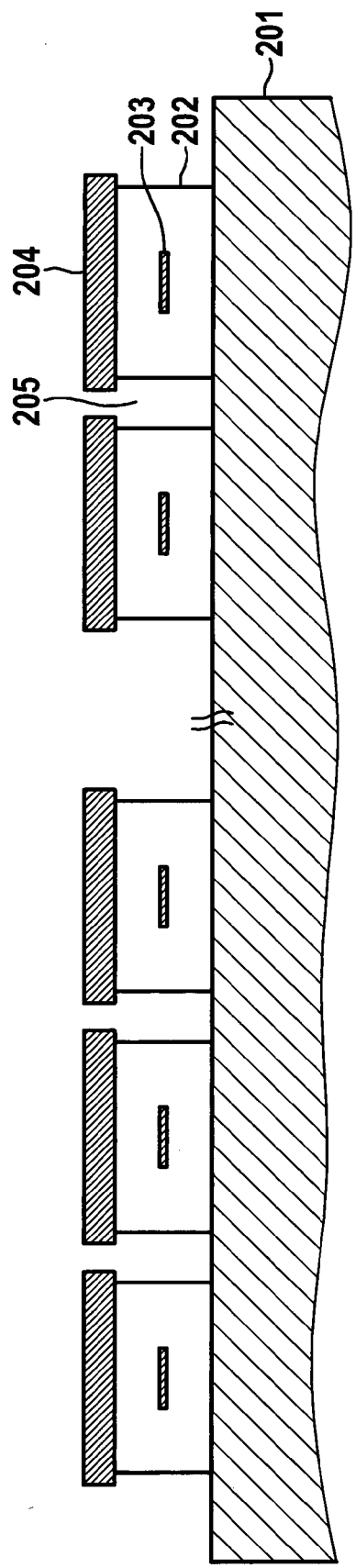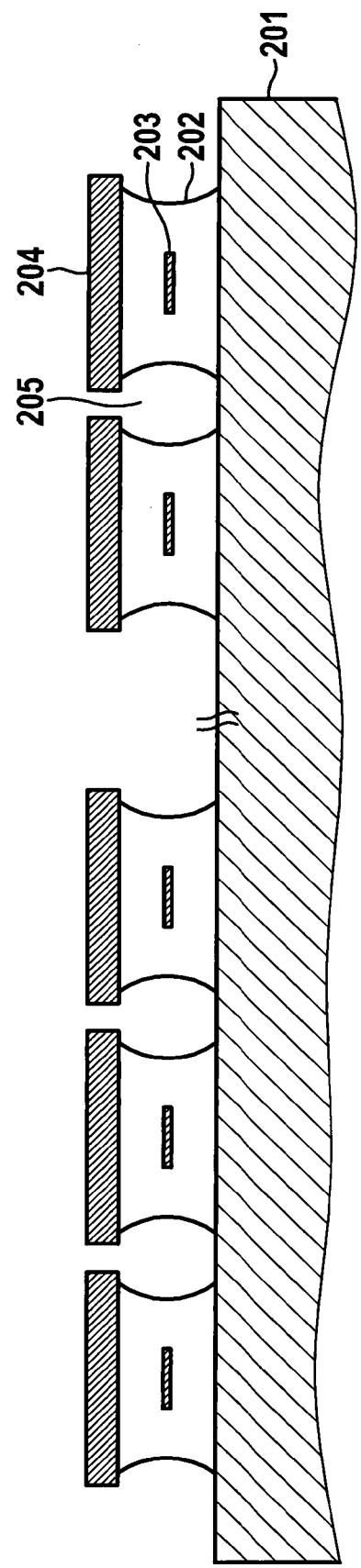

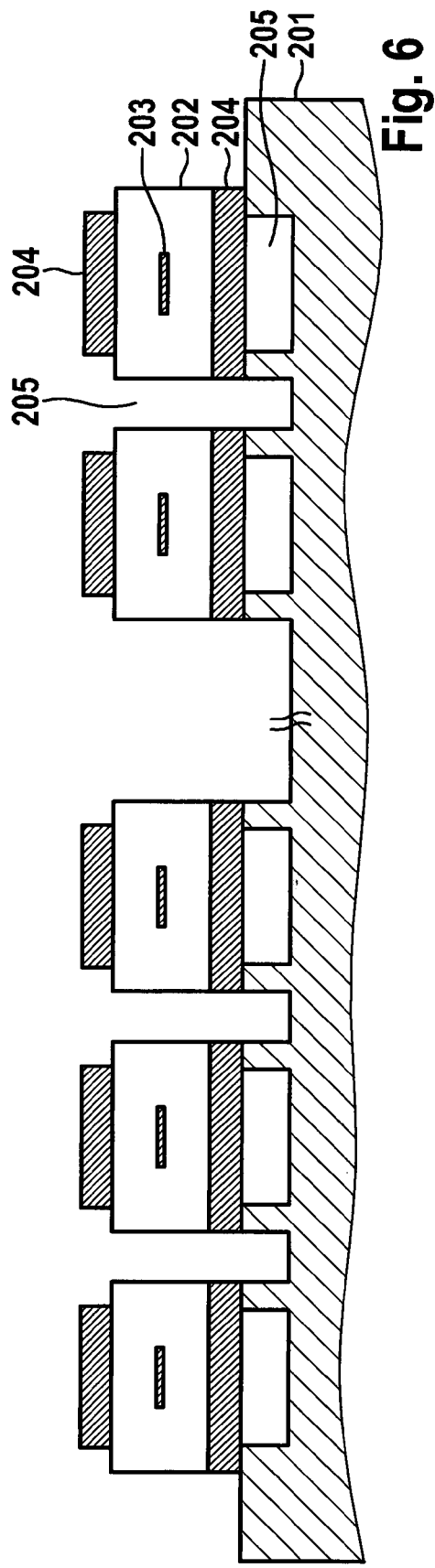
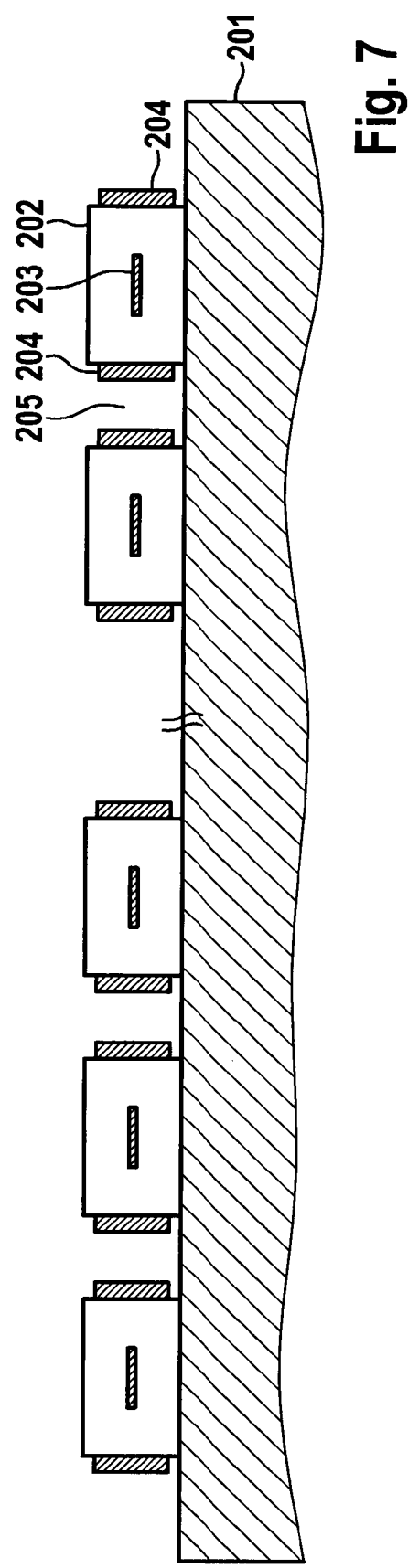

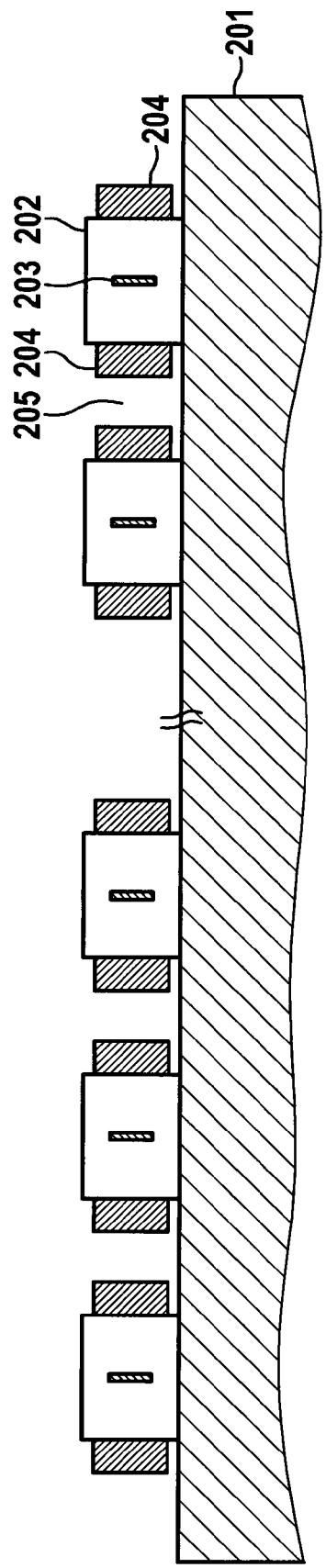
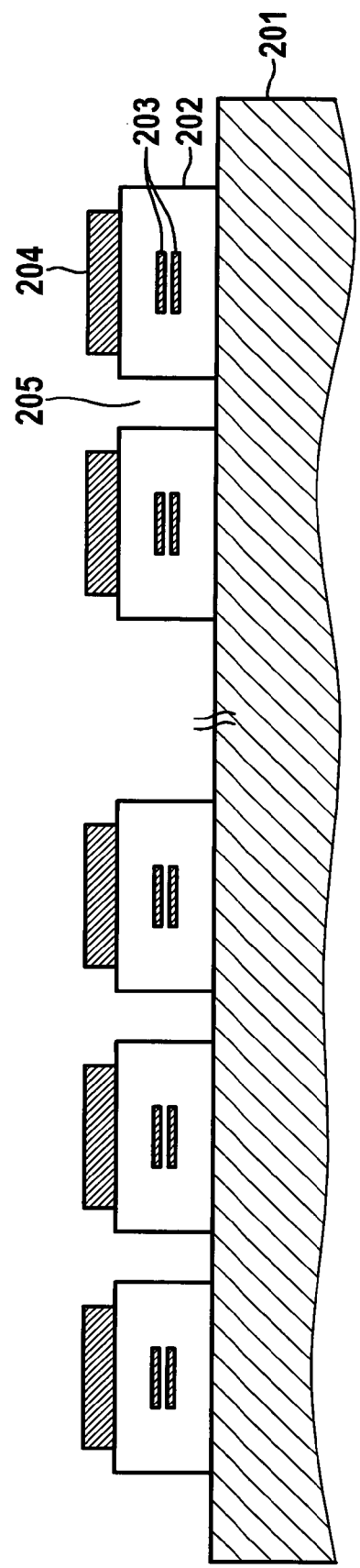

STRESS-OPTIC PHASE SHIFTER ARRAY FOR LIDAR AND OTHER APPLICATIONS

CROSS-REFERENCE TO RELATED APPLICATIONS

This application is a 35 U.S.C. § 371 National Stage Application of PCT/EP2019/051223, filed on Jan. 18, 2019, which claims priority to U.S. Provisional Application Ser. No. 62/624,148, filed on Jan. 31, 2018, the disclosures of which incorporated herein by reference in their entirety.

BACKGROUND

An exemplary Lidar (light detection and ranging) system is illustrated in FIG. 1a in which a light beam TX, such as a laser beam, is transmitted by an antenna element, or multiple antenna elements, toward an object or scene. The reflected light RX is received by a photodetector, such as a photodiode array, and processed to generate image with depth information for further processing. The transmission of the TX light can be implemented by a TX module and the light detection by an RX module. In the exemplary LIDAR of FIG. 1a, the TX module includes a light source, such as a laser, controlled by circuitry, such as laser modulation circuitry, with the beam provided to a waveguide array. The waveguide is formed of a material that can convey the laser light to an output end. The TX module includes optics that receives the light propagated through each waveguide and combines the light beams to produce a single output TX light or wavefront. The single output light can be a far-field beam that is useful in Lidar applications.

In the typical Lidar system, beam steering is needed to scan the scene with the laser light. In such applications phase-shifting of the light beam emitting from each antenna element can change the angle of the wavefront transmitted by the TX module. A diagram of the beam steering component B of the TX module is shown in FIG. 1b. A light input is provided to a plurality of waveguides through a beam splitter. The light output from the waveguides can be through an antenna array that directs the light output to an object or a scene. The input light passes through a beam splitter that directs the light to a plurality of waveguides in an array, which can be semi-conductor waveguides. The waveguide array incorporates a phase-shifter array that is controlled by the beam steering circuitry B (FIG. 1) to adjust the amount of phase-shifting of the light passing through each waveguide and transmitted at the antenna array. This phase adjustment enables changing the angle of the wavefront dynamically and pointing the TX light to different parts of a scene.

Since the propagation speed of light is inversely proportional to the refractive index of the medium through which the light is conveyed, phase delay can be induced by a change in refractive index. Stress-optic (or photoelastic) effect describes changes in refractive indices of a material under mechanical stress. Many applications have been developed based on the stress-optic effect. One of the example applications is a photoelastic modulator (PEM) which modulates the polarization of the light by changing the birefringence of the optical component. Another application is in a Mach-Zehnder interferometer (MZI) based optical amplitude modulator, as described in more detail in Hosseini, Naser, et al. "Stress-optic modulator in TriPlex platform using a piezoelectric lead zirconate titanate (PZT) thin film." Optics Express (2015), and in Epping Jom P., et al. "Ultra-low-power stress-optics modulator for microwave photonics." Proc. SPIE 10106, Integrated Optics: Devices, Materials, and Technologies XXI, 101060F (2017), the entire disclosures of which are incorporated herein by reference. Modulators of this type use the stress-optic effect to induce phase delay in any of the waveguide optical paths to adjust the phase delay between the light propagating in the optical paths and to modulate intensity of the output light.

By the use of electrical, mechanical, thermal or other approaches, phase delay can be induced into each phase shifter in the phase shifter array. Furthermore, if the phase shifters of an array are arranged in a certain pattern, or if the phase shifter array is combined with an antenna array, change of beam propagation direction or beam steering can be achieved. In an optical phase shifter array, phase delays may be induced by electro-optic effect, thermo-optical effect, stress-optic effect or any other mechanisms that can change the refractive indices of optical propagating media.

Electro-optic phase shifter arrays and thermo-optic phase shifter arrays have been widely studied and used in various applications. Compared to electro-optic phase shifter arrays, stress-optic phase shifter arrays can induce phase delays without affecting the optical beam intensities. Electro-optic phase shifter arrays always have the issue of inducing beam amplitude changes as well as phase changes. Compared to thermo-optic phase shifter array, stress-optic phase shifter array has advantages of less power consumption and higher response rate.

This disclosure provides stress-optic phase shifter arrays that may be applied in all the applications in which phase shifter arrays are needed. In the present disclosure the phase shifter array is used in a Lidar system as an example to explain the details of the inventive array.

SUMMARY OF THE DISCLOSURE

An optical element for transmitting a light beam includes a waveguide configured to transmit the light beam from an input end to an output end and having an optical property that can be modified by deformation of the waveguide. A phase-shifter is affixed to the waveguide and is operable in response to a control signal to mechanically deform the waveguide sufficient to induce a phase shift in the light beam transmitted therethrough. The phase-shifter can include a layer of a piezo-electric material, such as PZT. The phase-shifter can be affixed to the waveguide at various locations on the waveguide, such as on the top surface, side surface(s) and bottom surface between the waveguide and a substrate. The phase-shifter is connected to a controller that applies an electrical signal to the phase-shifter to induce the deformation of the waveguide.

DESCRIPTION OF THE DRAWINGS

FIGS. 2-9 are exemplary structures for phase shifter arrays according to the present disclosure for use in the transmitter shown in FIG. 1b, as seen in a cross section view at line A of FIG. 1b.

DETAILED DESCRIPTION

Figure 1A:
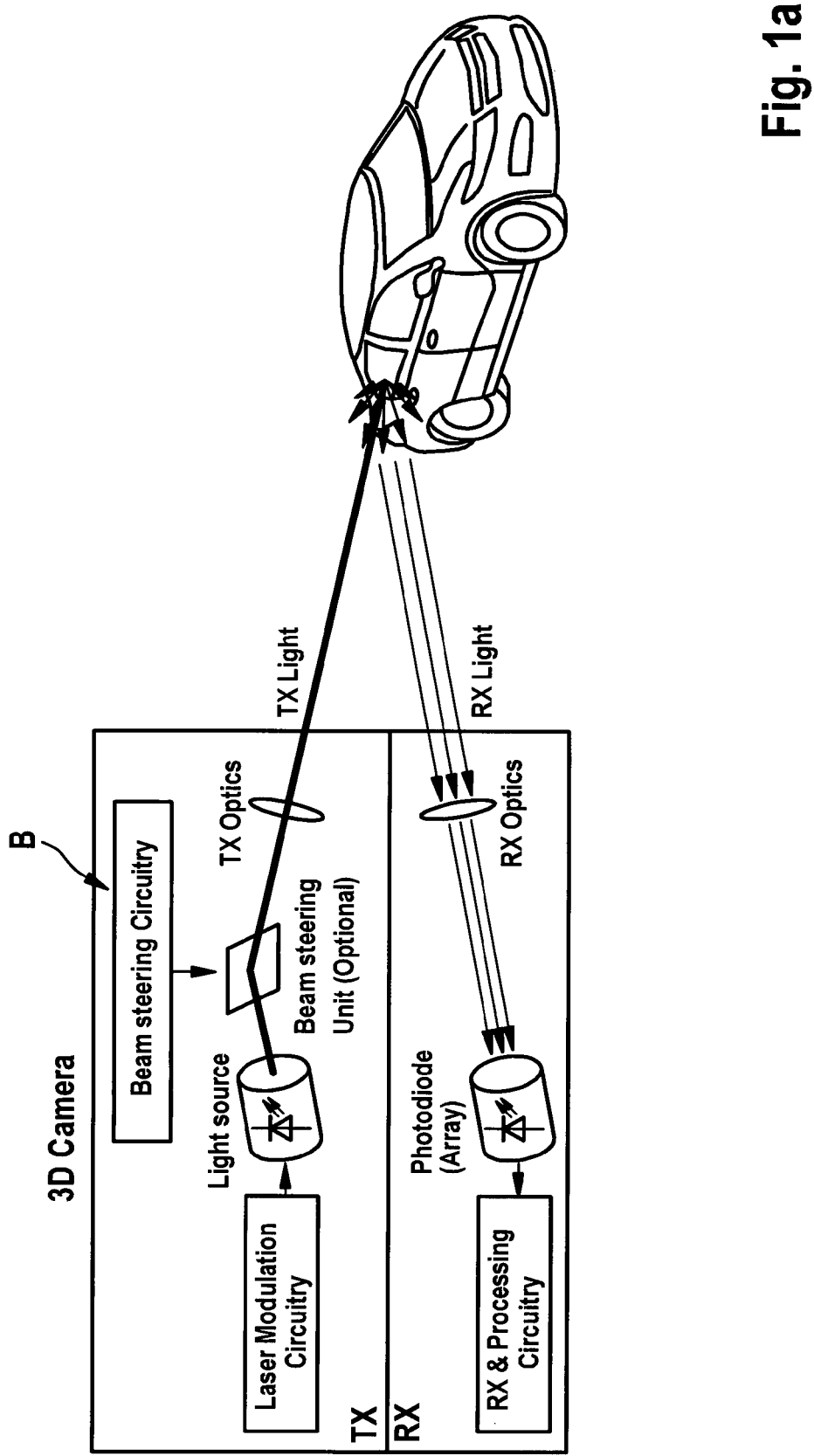
FIG. 1a is a diagram of a Lidar system.
Figure 1B:
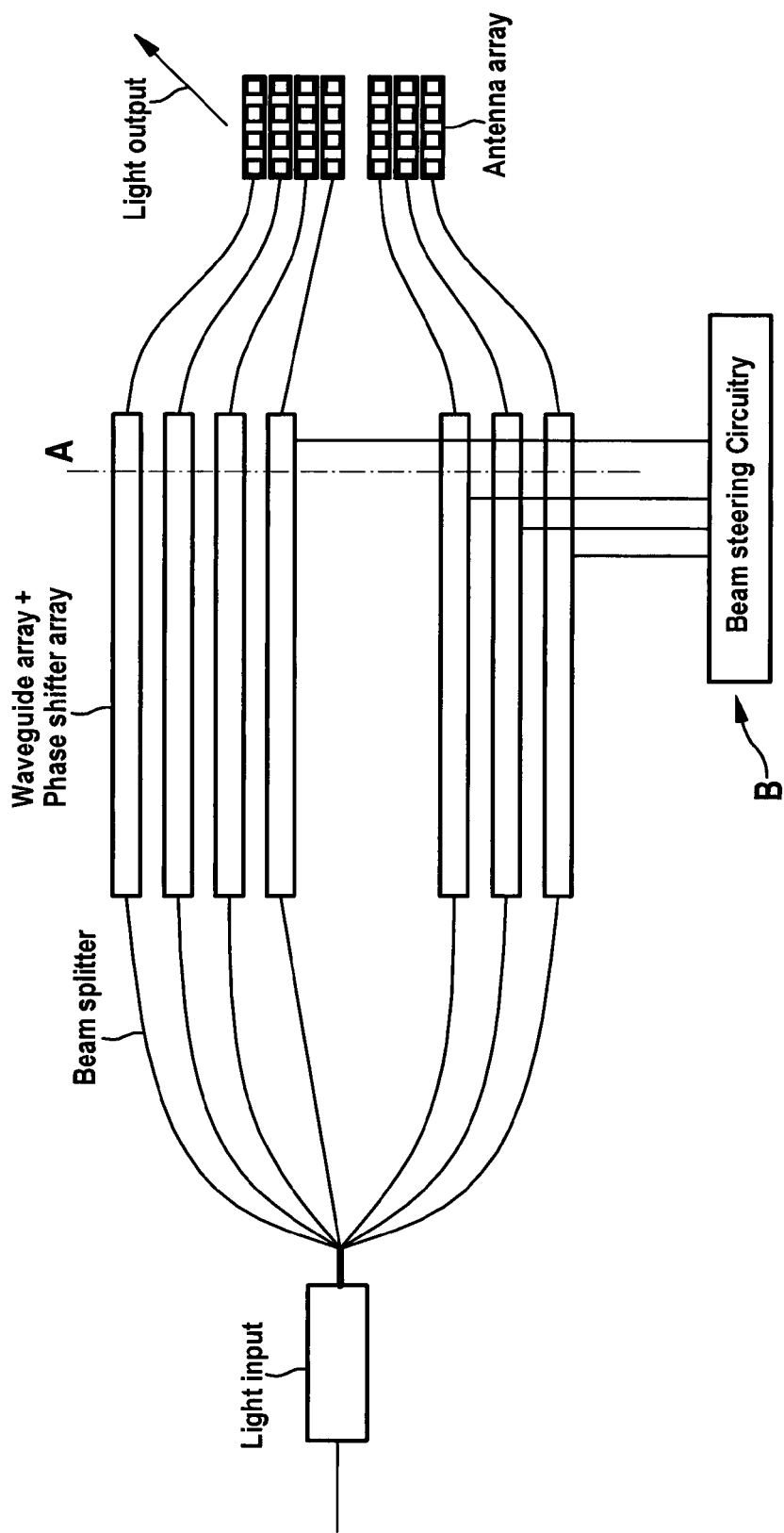
FIG. 1b is a schematic diagram of an exemplary transmitter, such as for use in the Lidar system of FIG. 1b, in which the transmitter incorporates a phase-shifter in the waveguides.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains The present disclosure contemplates configurations of phase-shifter arrays based on stress-optic effect, with exemplary structures illustrated in the cross-sectional views of FIGS. 2-9. All the examples are based on a phase array on a waveguide array platform. It is understood that the phase-shifter arrays disclosed herein can be incorporated into the transmitter, as shown in FIG. 1b, as well as into the RX module receiving the reflected light. In the transmitter, the phase-shifter array is incorporated between the light source and the TX optics, whereas in the receiver the phase-shifter array would be incorporated between the RX optics and the photodiode array.

The stress-optic phase shifter arrays disclosed herein include an array of phase shifters, with each phase shifter including a waveguide platform in the form of waveguide substrate 201, waveguide cladding 202, and waveguide core 203, all separated by an air gap 205. Each phase shifter further includes a stress-inducing component 204. The waveguide substrate 201 can be any substrate used in a waveguide platform, such as silicon. The waveguide cladding 202 can be any material used in a waveguide, such as silicon dioxide. The waveguide core 203 can be any material used in a waveguide, such as silicon, silicon nitride, etc. The refractive index of the waveguide cladding 202 is preferably smaller than the refractive index of the waveguide core 203. For the exemplary materials mentioned above, the difference in refractive index between cladding 202 and core 203 can range from 0.01 to 3. However, this difference can be outside this range based on different materials.

The waveguide platform can be a single-core waveguide, as shown in FIGS. 2-8, or a double-core waveguide, as shown in FIG. 9. The thickness and width of the waveguide core 203 can range from a fraction of a specific wavelength to multiple times a specific wavelength—ranging from a few nanometers to tens of micrometers thick. The thickness of the waveguide cladding 202 can be any thickness that is sufficient to ensure zero or very little leakage of the light from the waveguide core 203, and may range from hundreds of nanometers to hundreds of micrometers. The width of the waveguide cladding 202 can be any width that is larger than the core 203 width, and may range from hundreds of nanometers to hundreds of micrometers.

The stress-inducing component 204 may include one or more layers of materials that are deposited layer-by-layer onto the waveguide platform. At least one layer is affixed, such as by adhesive, to the waveguide cladding 202 so that the stress-inducing component 204 can be fixed on the waveguide platform in a manner that allows the component to induce stress into the waveguide cladding 202 and particularly into the waveguide core 203 to change its refractive index. Mechanical stress can be induced by the component 204 using various physical mechanisms, such as gravity, electromagnetic fields, electrostatic force, piezoelectricity, temperature etc. Using these mechanisms, stress can be induced through application of an electrical field/voltage/current, magnetic field, mechanical force etc. to the phase-shifter stress-inducing component 204.

One example of stress-inducing component 204 consists of a piezo-electric component formed of a piezo-electric material, such as lead zirconate titanate (PZT), aluminum nitride (AlN), and similar materials, and certain electrode materials, such as gold, platinum, titanium, and the like. The electrode materials can be placed on the top and bottom of a piezoelectric material to form a top electrode and a bottom electrode, or can be placed on the left and right side of piezoelectric material to form left and right electrodes. By applying voltage to the piezoelectric material through the electrodes, mechanical stress is generated in the piezoelectric material. The applied voltage can range from millivolts to hundreds of volts. Since the entire component 204 is clamped onto the waveguide platform, stress generated in the component 204 is induced directly into the waveguide cladding 202 and waveguide core 203.

In some embodiments, the stress-inducing component 204 is positioned only on top of the waveguide platform, as shown in FIGS. 2-5 and 9. Alternatively, the component 204 can include first and second phase-shifter components, with a first component affixed between the bottom of the waveguide cladding and the substrate, and a second component on the top of the waveguide cladding, as shown in FIG. 6. In a further alternative, the stress-inducing component can be disposed on one or more side of each waveguide, as depicted in FIGS. 7-8. Thus, a first phase-shifter component can be affixed to a first side of the waveguide that is substantially perpendicular to the substrate, and a second phase-shifter component can be affixed to an opposite second side of the waveguide. It can be appreciated that in embodiments where two phase-shifter components are utilized, both components are controlled in unison to induce deformation in the waveguide in the same direction. The waveguide can have various configurations, such as the elongated configuration shown in FIG. 7 or the more narrow configuration, such as the configuration shown in FIG. 8. The phase-shifter components can be oriented substantially perpendicular to the waveguide core 203, as shown in the embodiment of FIG. 7, or the phase-shifter components can be arranged parallel to the core as in the embodiment of FIG. 8. It can be appreciated some configurations of waveguides and orientations of phase-shifters may require a greater force for the same deformation than other configurations.

The dimension of stress-inducing component 204 can be hundreds of nanometers to several micrometers thick and hundreds of nanometers to hundreds of micrometers wide. The width of the component can be smaller than (FIGS. 2, 6, 9), equal to (FIGS. 3, 6) or larger than (FIGS. 4, 5) the width of the waveguide cladding 202.

An air gap 205 can be formed by either dry etching or photolithography between two adjacent phase shifters. The air gap 205 separates one phase shifter from an adjacent phase shifter so that the phase shifters are isolated from the stress induced in any of the other phase shifters. The air gap 205 can be any shape, such as rectangular, as shown in FIG. 4, or arcuate, as shown in FIG. 5, provided that the narrowest part of the gap width is wide enough to prevent any influence from neighboring phase-shifters and stress-inducing components. The air gap 205 width can be as small as tens of nanometers. Additional air gaps 205 may be desirable in certain configurations, such as the embodiment shown in FIG. 6, where all or part of the stress-inducing component 204 is disposed underneath the waveguide cladding 202. In this embodiment the air gap 205 underneath the bottom stress-inducing component 204 can suspend the bottom stress-inducing component 204 from the substrate 201, so that the stress generated in the component 204 can be efficiently induced into the cladding 202 and core 203 only, instead of into the substrate 201. It can be appreciated that the embodiment of FIG. 6 can be modified so that the lower phase-shifter component is disposed wholly inside the air gap, with the substrate 201 supporting the waveguide itself. The footprint of a stress-optic phase shifter array configured according to the embodiments of FIGS. 2-9 can be as small as a few micrometers wide and hundreds of micrometers long.

Figure 10:
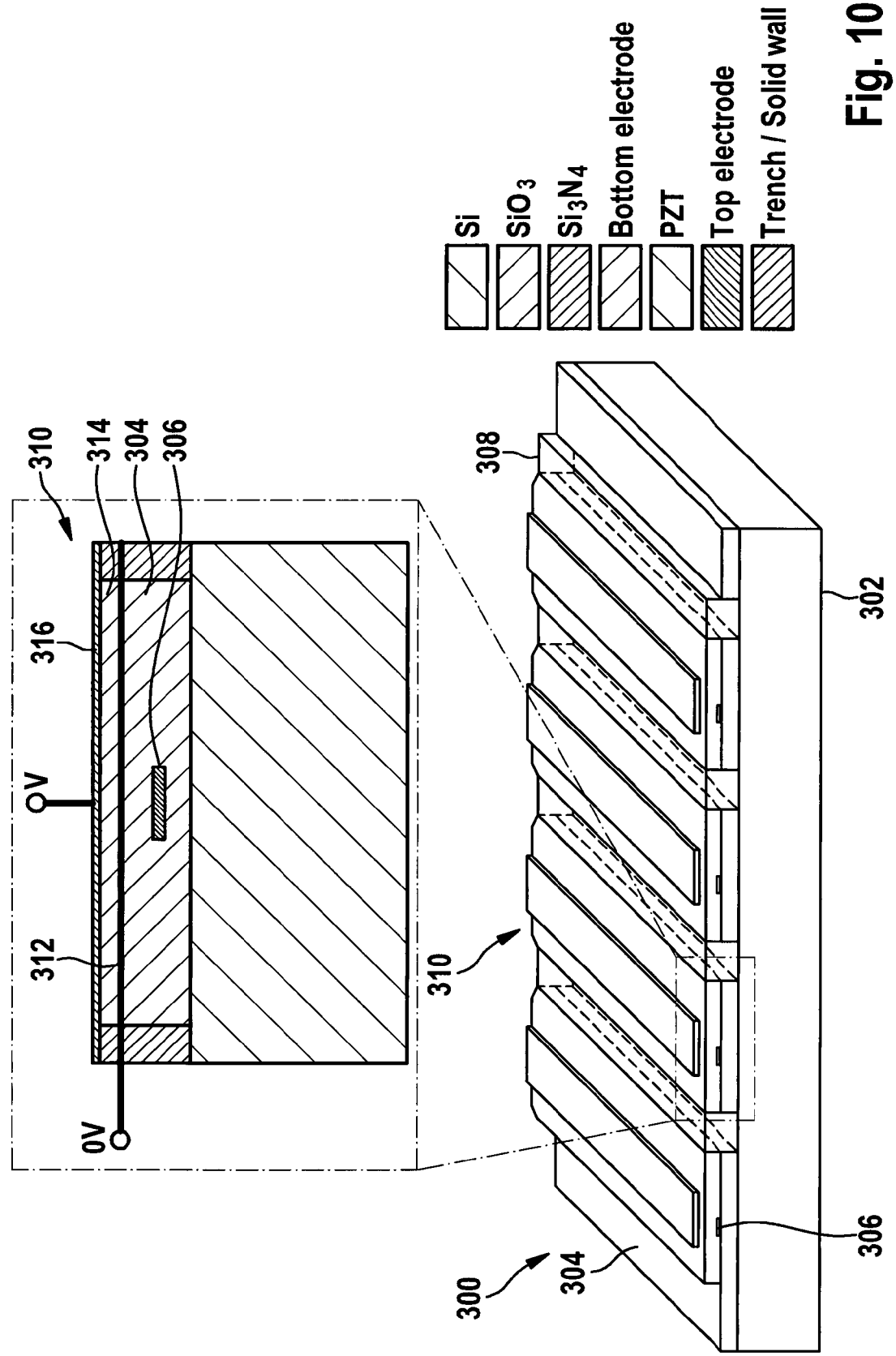
FIG. 10 is an enlarged perspective representation and end view of a waveguide structure according to the present disclosure.
Figure 12:
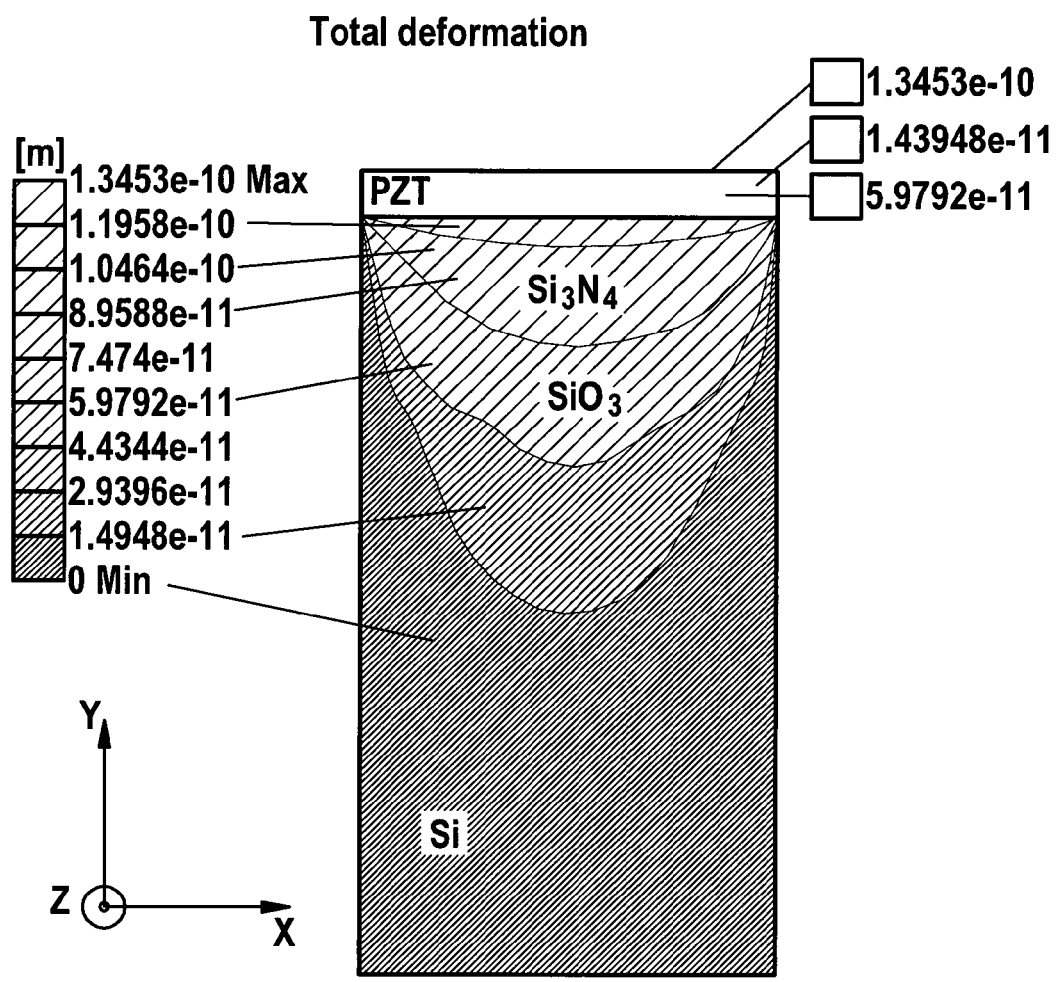
FIG. 12 is a stress diagram of an exemplary waveguide incorporating the phase-shifter of the present disclosure showing the amount of deflection of the structural components.

An exemplary semi-conductor waveguide 300 with a PZT-based phase-shifter 310 is depicted in FIG. 10. The waveguide includes a substrate 302, which is silicon in the present example, with waveguide cladding layers 304 of $SiO_2$ with a core 306 of $Si_3N_4$ separated by trenches 308. The phase-shifter 310 includes a bottom electrode 312 affixed to the surface of the waveguide cladding layer 304. The PZT layer 314 follows with the top electrode 316. The two electrodes 312, 316 are connected to a controllable voltage source, such as the beam circuitry B in FIGS. 1a-1b. In the specific example, waveguide core is sized at 25 nm×4.4 μm, and the PZT layer 314 has a thickness of 1 μm and a length of 3-5 mm. The exemplary phase-shifter achieved a π phase shift with a 10V voltage applied to the phase-shifter. The deformations of the waveguide and phase-shifter components are illustrated in the stress diagram of FIG. 12. It can be seen that the maximum deformation occurs in the upper portion of the waveguide cladding just below the PZT phase-shifter. The waveguide core endures moderate deformation that is roughly half the deformation at the upper surface of the waveguide cladding. This deformation is enough to induce a π phase shift in a 3-5 mm long waveguide of the present example.

Figure 11:
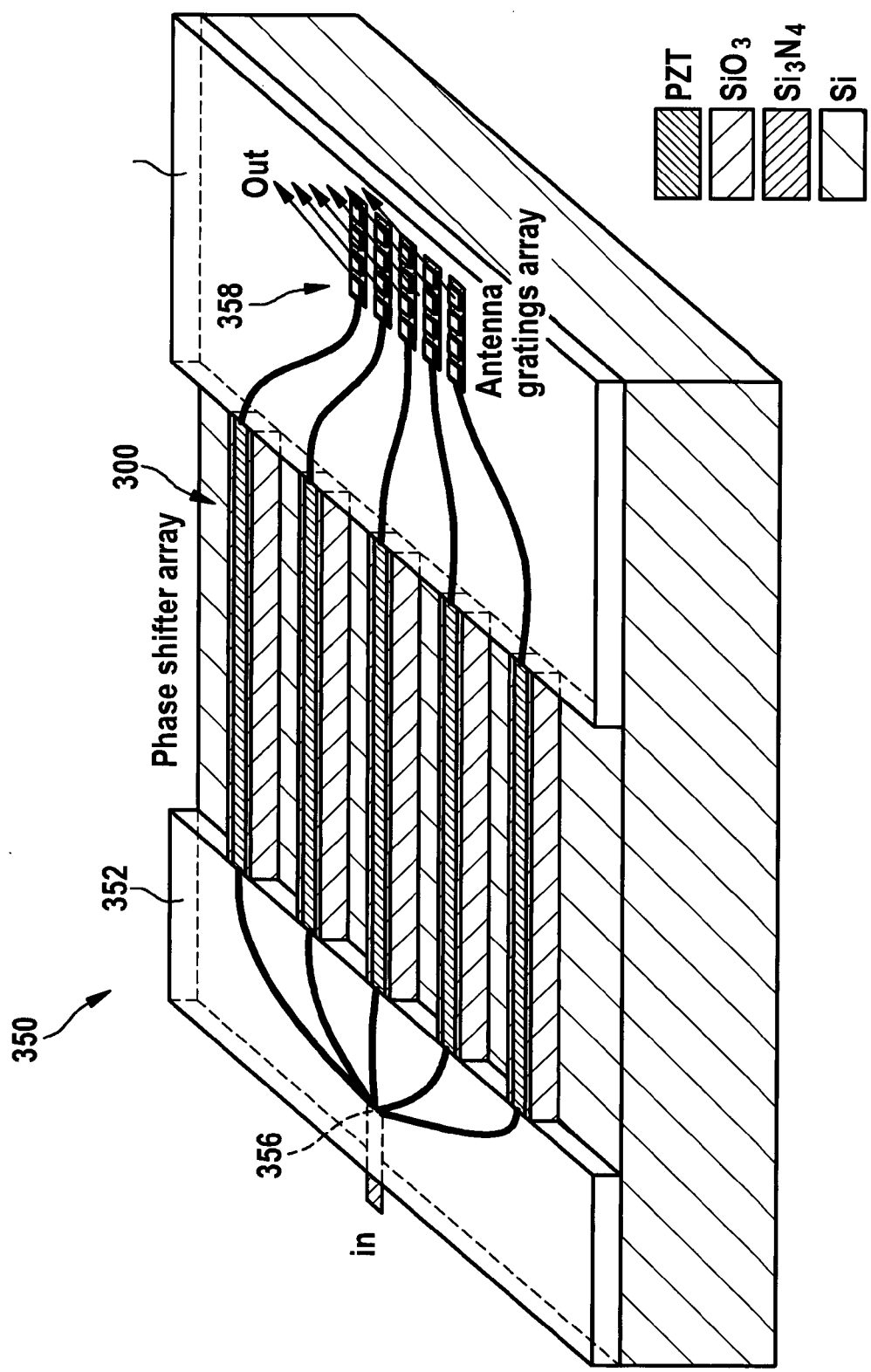
FIG. 11 is an enlarged perspective representation of an optical element incorporating the waveguide and phase-shifter of the present disclosure.

The waveguide 300 can be incorporated into an optical element 350, as shown in FIG. 11, engaged between substrates 352, 354 formed of the material of the waveguide cladding 304 (FIG. 10). The substrate 352 can incorporate the beam splitter 356 between the light input and the individual waveguides. The substrate 354 can incorporate an antennae array 358 for transmitting the plurality of light beams propagated through the waveguide 300 in which the antenna is embedded within the substrate or formed on the surface of the substrate. Alternatively, the antenna in the array can be incorporated into the end of each waveguide. It can be appreciated that the optical element and waveguide can be manufactured using conventional semiconductor and silicon photonic production techniques. Thus, the optical element can be incorporated into an ASIC, including the circuitry B that controls the phase-shifters described herein.

The phase shifting capabilities of the structure depends on several design parameters, such as PZT dimension, waveguide core dimension, waveguide cladding thickness and waveguide materials. It has been found that phase shifters on waveguides with thinner and/or narrower waveguide cores can produce a greater stress-optic effect. It was further found that phase shifters in an array separated on a substrate by a trench, such as trenches 308, have better phase shifting performance than phase shifter arrays separated by silicon.

Certain phase-shifters disclosed herein are configured to mechanically deform or deflect the waveguide to alter certain optical properties of the waveguide to induce a phase shift in a light beam propagated through the waveguide. In particular, certain phase-shifters alter the refractive index of at least the waveguide core by deforming or deflecting the waveguide core. In these embodiments, the phase-shifter component is sized and configured to limit the deflection of the waveguide only as needed to alter the refractive index of the waveguide. In other words, the phase-shifters are configured so that the deflection of the waveguide does not alter any other optical propagation or transmission property of the waveguide. The amount of deflection that is suitable to only alter refractive index depends on the material and dimensions of the waveguide and the waveguide core. In the example illustrated in FIG. 12, the $Si_3N_4$ was deflected about 4.7e-11 m to induce a π phase shift in the waveguide. A smaller deflection would produce a smaller phase shift, while a larger deflection might produce other changes in the optical properties of the waveguide that might compromise the optical transmissivity of the waveguide.

The present disclosure should be considered as illustrative and not restrictive in character. It is understood that only certain embodiments have been presented and that all changes, modifications and further applications that come within the spirit of the disclosure are desired to be protected.

What is claimed is:

1. An optical element for transmitting a light beam comprising:
   a waveguide configured to propagate the light beam from an input end to an output end, said waveguide having an optical property that can be modified by deformation of said waveguide; and
   a phase-shifter affixed to said waveguide, said phase-shifter configured and operable in response to a control signal to mechanically deform or deflect said waveguide in response to a control signal sufficient to induce a phase shift in the light beam propagated therethrough, wherein:
      said waveguide is mounted on a substrate,
      said phase-shifter includes a first phase-shifter component affixed between said waveguide and said substrate and a second phase-shifter component affixed to said waveguide on a surface of said waveguide opposite said substrate, and
      said substrate is configured to define an air gap between said substrate and said second phase-shifter component.

2. The optical element of claim 1, wherein said optical property of said waveguide is the refractive index.

3. The optical element of claim 1, wherein said phase-shifter includes a piezo-electric component configured to deform in response to an electrical signal as said control signal.

4. The optical element of claim 3, wherein said piezo-electric component includes:
   a layer of a piezo-electric material; and
   two electrodes connectable to an electrical source.

5. The optical element of claim 4, wherein said piezo-electric material is selected from lead zirconate titanate (PZT) and aluminum nitride (AlN).

6. The optical element of claim 1, wherein:
   said waveguide includes a plurality of waveguides separated by an air gap; and
   said phase-shifter includes a plurality of phase-shifters, each affixed to a corresponding one of said plurality of waveguides, and each configured and operable to deform or deflect the respective waveguide in response to a respective control signal.

7. The optical element of claim 6, further comprising:
optics at an output end of said plurality of waveguides configured to receive and combine the light beams propagated through each of said plurality of waveguides into a single transmitted light beam; and
a controller operable to provide a separate control signal to each of said plurality of phase-shifters to induce a separate phase shift in the corresponding waveguide, to thereby steer the single transmitted light beam.

8. The optical element of claim 1, wherein said first phase-shifter is affixed to said waveguide and is wholly contained within said air gap.

9. An optical element for transmitting a light beam comprising:
a waveguide configured to propagate the light beam from an input end to an output end, said waveguide having an optical property that can be modified by deformation of said waveguide; and
a phase-shifter affixed to said waveguide, said phase-shifter configured and operable in response to a control signal to mechanically deform or deflect said waveguide in response to a control signal sufficient to induce a phase shift in the light beam propagated therethrough, wherein:
said waveguide is mounted on a substrate, and
said phase-shifter is affixed to said waveguide on a surface of said waveguide that is substantially perpendicular to a surface of said waveguide that is mounted to said substrate.

10. The optical element of claim 9, wherein said phase-shifter includes first and second phase-shifter components affixed to opposite sides of said waveguide.

11. The optical element of claim 1, wherein said waveguide includes a waveguide core formed of an optically transmissive material, said core surrounded by cladding that is optically non-transmissive relative to said waveguide core, wherein said core and said cladding are configured to be mechanically deformed by said phase-shifter.

12. The optical element of claim 11, wherein:
said optical property of said waveguide is the refractive index;
said waveguide core has a core refractive index; and
said waveguide cladding has a cladding refractive index that is less than the core refractive index.

13. The optical element of claim 11, wherein said waveguide includes two waveguide cores.

14. The optical element of claim 9, wherein said phase-shifter includes a piezo-electric component configured to deform in response to an electrical signal as said control signal.

* * * * *